US011008784B2

(12) United States Patent
Fabre (10) Patent No.: US 11,008,784 B2
(45) Date of Patent: May 18, 2021

(54) DRIVERLESS VEHICLE, AND METHOD FOR SIMULTANEOUSLY UNLOCKING AT LEAST TWO DOORS OF SUCH A VEHICLE

(71) Applicant: LA POSTE, Paris (FR)

(72) Inventor: Jean Paul Fabre, Paris (FR)

(73) Assignee: LA POSTE, Paris (FR)

( * ) Notice: Subject to any disclaimer, the term of this patent is extended or adjusted under 35 U.S.C. 154(b) by 135 days.

(21) Appl. No.: 16/329,099

(22) PCT Filed: Aug. 30, 2017

(86) PCT No.: PCT/FR2017/052311
§ 371 (c)(1),
(2) Date: Feb. 27, 2019

(87) PCT Pub. No.: WO2018/042130
PCT Pub. Date: Mar. 8, 2018

(65) Prior Publication Data
US 2019/0226245 A1    Jul. 25, 2019

(30) Foreign Application Priority Data
Sep. 1, 2016 (FR) .................................... 1658146

(51) Int. Cl.
*E05B 77/48* (2014.01)
*B60R 25/24* (2013.01)
(Continued)

(52) U.S. Cl.
CPC .............. *E05B 77/48* (2013.01); *B60P 3/007* (2013.01); *B60R 25/241* (2013.01);
(Continued)

(58) Field of Classification Search
CPC .......... E05B 77/48; E05B 81/56; E05B 81/64; E05B 81/70; B60R 25/241; B60R 25/403;
(Continued)

(56) References Cited

U.S. PATENT DOCUMENTS 1,130,464 A    3/1915 Barron
9,256,852 B1   2/2016 Myllymaki
(Continued)

FOREIGN PATENT DOCUMENTS

DE     10164574 A1    4/2004
EP     2397051 B1     5/2013
(Continued)

OTHER PUBLICATIONS

Foreign Communication from a Related Counterpart Application, International Search Report dated Nov. 21, 2017, International Application No. PCT/FR2017/052311 filed on Aug. 30, 2017.
(Continued)

*Primary Examiner* — Peter D Nolan
*Assistant Examiner* — Ashley L Redhead, Jr.

(57) ABSTRACT

The present invention relates to a driverless vehicle comprising at least two compartments, two opening elements, at least one retractable compartment partition, and an unlocking device comprising an electronic lock for each opening element, which is able to be locked or unlocked depending on the value of an instruction. The vehicle also comprises a control module comprising a sensor for receiving a digital key and an electronic component for authenticating the digital key and generating an instruction signal. The electronic lock comprises means for detecting closure of the opening elements, and the control module comprises digital key generation means able to generate a unique digital key upon each closure of the opening elements, the electronic component being able to authenticate the received digital key through comparison with the generated unique digital key.

10 Claims, 3 Drawing Sheets

(51) Int. Cl.
    *E05B 81/64*     (2014.01)
    *B60P 3/00*     (2006.01)
    *G07C 9/00*     (2020.01)
    *B60R 25/40*     (2013.01)
    *E05B 81/56*     (2014.01)
    *E05B 81/70*     (2014.01)
    *G06Q 10/08*     (2012.01)

(52) U.S. Cl.
    CPC ............ *B60R 25/403* (2013.01); *E05B 81/56* (2013.01); *E05B 81/64* (2013.01); *E05B 81/70* (2013.01); *G07C 9/00896* (2013.01); *G06Q 10/083* (2013.01); *G07C 2009/0065* (2013.01); *G07C 2009/0092* (2013.01)

(58) Field of Classification Search
    CPC ................ B60P 3/007; G07C 9/00896; G07C 2009/0065; G07C 2009/0092; G06Q 10/083
    See application file for complete search history.

(56) References Cited

U.S. PATENT DOCUMENTS

| | | | |
|---|---|---|---|
| 9,745,130 B1* | 8/2017 | Rawal | G06Q 10/0836 |
| 2003/0014649 A1* | 1/2003 | Funahashi | G07C 9/257 |
| | | | 713/186 |
| 2008/0116746 A1 | 5/2008 | Hein | |
| 2018/0024554 A1* | 1/2018 | Brady | G06Q 10/08 |
| | | | 701/23 |

FOREIGN PATENT DOCUMENTS

| | | |
|---|---|---|
| WO | 2016042232 A1 | 3/2016 |
| WO | 2018042130 A1 | 8/2018 |

OTHER PUBLICATIONS

Foreign Communication from a Related Counterpart Application, Written Opinion dated Nov. 21, 2017, International Application No. PCT/FR2017/052311 filed on Aug. 30, 2017.

\* cited by examiner

DRIVERLESS VEHICLE, AND METHOD FOR SIMULTANEOUSLY UNLOCKING AT LEAST TWO DOORS OF SUCH A VEHICLE

CROSS-REFERENCE TO RELATED APPLICATIONS

The present application is a filing under 35 U.S.C. 371 as the National Stage of International Application No. PCT/FR2017/052311, filed Aug. 30, 2017, entitled "DRIVERLESS VEHICLE, AND METHOD FOR SIMULTANEOUSLY UNLOCKING AT LEAST TWO DOORS OF SUCH A VEHICLE," which claims priority to French Application No. FR 1658146 filed with the Intellectual Property Office of France on Sep. 1, 2016 both of which are incorporated herein by reference in their entirety for all purposes.

TECHNICAL FIELD OF THE INVENTION

The present invention relates in general to the field of driverless vehicles. It targets in particular a driverless vehicle of the type comprising at least one compartment for receiving an object, and at least one opening element forming access to this compartment from outside the vehicle. The present invention also targets a method for simultaneously unlocking at least two opening elements of such a driverless vehicle.

Such driverless vehicles may be completely autonomous or be remotely controlled via radio. Vehicles of this type are applied for example in the fields of logistics and goods delivery, in particular in order to be able to respond to the problem of delivery "over the last mile" at a low cost.

PRIOR ART

A driverless vehicle including a compartment for receiving an object and an opening element forming access to the compartment from outside the vehicle is known. The vehicle furthermore includes a device for unlocking the opening element. The unlocking device comprises in particular data acquisition means, allowing for example a user to input an alphanumeric code in order to bring about unlocking of the opening element. One problem that is encountered in such devices, besides the constrictive aspect of manually inputting the code, is that of the code possibly being stolen by a malicious individual.

One known solution for partly mitigating the abovementioned drawback is provided by driverless vehicles allowing access to the compartment to be secured using a digital key that is transmitted via a mobile telephone.

Such a driverless vehicle includes, besides the compartment for receiving the object, an opening element forming access to the compartment from outside the vehicle. The vehicle also includes a device for unlocking the opening element, which comprises an electronic lock and a control module linked to the electronic lock via a data link.

The electronic lock comprises motor means able to lock and unlock the opening element depending on the value of an instruction received via the data link. The control module comprises a sensor for sensing a signal and an electronic recognition component for authenticating a digital key. The electronic recognition component is linked to the electronic lock via the data link and is able to authenticate a digital key received by the signal sensor, and transmitted from the mobile telephone. To this end, the control module furthermore comprises a memory that stores a list of predetermined digital keys that authorize unlocking of the opening element. Once the digital key has been authenticated by the electronic recognition component, the latter generates, on the data link, an instruction signal to deactivate the motor means of the electronic lock in order to unlock the opening element.

However, the security in relation to the unlocking of the opening element in such a driverless vehicle may be compromised if an unauthorized user uses one or more digital keys that have already been used and that belong to the list of predetermined digital keys. Furthermore, such an unlocking device requires relatively complex and expensive maintenance inside the vehicle, in particular in order to update the list of "valid" digital keys in the memory of the control module at all times.

DISCLOSURE OF THE INVENTION

The invention described hereinafter aims to rectify all or some of the drawbacks of the prior art, and in particular to propose a driverless vehicle comprising at least one compartment for receiving an object, and at least one opening element forming access to this compartment from outside the vehicle, making it possible to ensure closure and unlocking of the opening element in a simple and reliable manner, while at the same time improving the level of security linked to the unlocking.

To this end, one subject of the invention, according to a first aspect, is a driverless vehicle comprising:
  at least one compartment defining an inner space for receiving an object;
  at least one opening element forming access to said compartment from outside the vehicle, said opening element being able to close off said inner space; and
  a device for unlocking the or each opening element, the device comprising at least one electronic lock and a control module linked to the electronic lock via a data link, the electronic lock comprising motor means able to lock and unlock the opening element depending on the value of an instruction received via the data link, the control module comprising a sensor for sensing a signal comprising a digital key and an electronic recognition component for authenticating the digital key, the sensor being able to transmit the signal to the electronic recognition component, said component being linked to the data link and being supplied with power by electric power supply means, the authentication of the digital key by the electronic component generating an instruction signal to deactivate the motor means in order to unlock the opening element,
wherein the electronic lock comprises means for detecting closure of the opening element, which means are able to transmit a closure detection signal on the data link, and the control module furthermore comprises means for transmitting a signal and digital key generation means linked to the electric power supply means, to the electronic component and to the transmission means, the generation means being able to generate a unique digital key upon each closure of the opening element, the transmitted signal containing the generated unique digital key, the electronic component being able to authenticate the received digital key through comparison with the generated digital key.

By virtue of the presence of means for detecting closure of the opening element inside the electronic lock and of means for generating a unique digital key inside the control module, and by virtue of the fact that the electronic recognition component is able to authenticate the received digital key through comparison with the generated unique digital key, the risk of an unauthorized individual compromising the inside of the compartment closed off by the opening element by using one or more keys that have already been used is greatly reduced. This makes it possible to achieve a high level of security and thus to be able for example to assign temporary access to the inside of the compartment to an identified user, by providing this user with the generated digital key. The driverless vehicle according to the invention thus advantageously makes it possible to ensure that only the identified user, or one of the representatives that he has designated beforehand, is able to unlock the opening element in order to access the corresponding compartment of the vehicle.

Advantageously, the electronic component comprises an electronic clock, timestamp information is associated with the generated unique digital key, and the electronic component is able to authenticate a received digital key through comparison with the generated unique digital key only for a predetermined duration.

This feature makes it possible to reduce the risk of compromising access to the compartment corresponding to the opening element, if a generated digital key is stolen after it has been transmitted. An additional gain in security is thus achieved.

According to one particular technical feature of the invention, the vehicle is a land vehicle able to be controlled remotely via radio.

According to another particular technical feature of the invention, the vehicle is an autonomous land vehicle.

Advantageously, the electric power supply means comprise an electrical energy storage element and an element for converting light energy into electrical energy, such as for example a photovoltaic panel, linked to the electrical energy storage element.

This allows the electrical energy storage element to be recharged continuously and autonomously, and thus contributes to reducing or even eliminating operations of replacing the electric power supply means.

According to one particular technical feature of the invention, the electronic lock furthermore comprises means for supplying electric power to the motor means.

Advantageously, the means for supplying electric power to the motor means comprise an electrical energy storage element and an element for converting light energy into electrical energy, such as for example a photovoltaic panel, linked to the electrical energy storage element.

This allows the electrical energy storage element to be recharged continuously and autonomously, and thus contributes to reducing or even eliminating operations of replacing the means for supplying electric power to the motor means.

Advantageously, the vehicle comprises at least two compartments, and at least two opening elements, each opening element forming access to a separate compartment, and the vehicle furthermore includes at least one retractable compartment partition and motor means linked to said partition and able to retract the partition and put it back in place depending on the value of a received control signal, said partition being arranged between two compartments so as to separate, in the non-retracted position, the respective inner spaces defined by these compartments, the control module furthermore being linked to the motor means and being able to transmit a control signal to the motor means in order to retract the partition or put it back in place.

This makes it possible to be able to combine at least two compartments of the vehicle so as to achieve a compartment of larger size. It is thus advantageously possible to adjust the size of the inner space of the resulting compartment, depending on the size of the object intended to be received there.

In one particular implementation of the invention, the digital key generation means of the control module are able, when said at least one compartment partition is in a retracted position, to generate a unique digital key only when closure of all of the opening elements that form access to the compartments arranged on either side of said retracted partition(s) is detected; and the electronic recognition component of the control module is able, when said at least one compartment partition is in a retracted position, to generate, following authentication of a digital key, a simultaneous deactivation instruction signal intended for the motor means of all of the electronic locks associated with the opening elements that form access to the compartments arranged on either side of said retracted partition(s), in order to unlock said opening elements.

This makes it possible, if at least two compartments of the vehicle are combined, to facilitate access to the inside of the resulting compartment via simultaneous opening of all of the opening elements that form access to this compartment, while at the same time making it possible to provide simple and reliable management of the generated digital keys.

According to another aspect, in connection with the particular implementation of the invention described above, another subject of the invention is a method for simultaneously unlocking at least two opening elements of a driverless vehicle, the method being implemented by the control module of a vehicle as described above according to the particular implementation of the invention, the method comprising an initial step of transmitting a control signal to retract said at least one partition, intended for motor means linked to said partition, the method furthermore comprising the following steps:

receiving, for each opening element forming access to the compartment arranged on either side of said or of one of said retracted partition(s), an opening element closure detection signal;

detecting the reception of all of the closure signals associated with all of the opening elements that form access to the compartments arranged on either side of said retracted partition(s);

generating a unique digital key;

storing the generated unique digital key inside the electronic recognition component;

transmitting a signal that contains the generated unique digital key;

receiving a signal that contains a digital key;

authenticating the received digital key through comparison with the generated digital key, by the electronic recognition component;

transmitting, on the or each data link in question, a simultaneous deactivation instruction signal intended for the motor means of all of the electronic locks associated with the opening elements that form access to the compartments arranged on either side of said retracted partition(s), in order to unlock said opening elements.

BRIEF DESCRIPTION OF THE FIGURES

Other features and advantages of the invention will emerge upon reading the following description, given solely by way of example and with reference to.

DETAILED DESCRIPTION OF ONE EMBODIMENT

In the remainder of the description, "opening element" is understood to mean any mechanical element able to move between a closed position, preventing access to the inside of a compartment of a vehicle, and an open position allowing access to the inside of the compartment.

"Communication device" is also understood to mean any roaming electronic device able to transmit and to receive data via a network or a wireless network portion, such as for example a portable computer, a telephone, a smartphone, or else a digital tablet, without this list being exhaustive.

"Motor means" are furthermore understood to mean mechanical engagement means for changing a first mechanical position or configuration of an element of the invention to a second mechanical position or configuration.

"Driverless vehicle" is also understood to mean any vehicle able to move on land, on water or in the air, autonomously and/or by being controlled remotely via radio.

A signature or a digital key will be referred to indiscriminately in the remainder of the description.

With reference to FIGS. 1 to 4, a driverless vehicle 1 comprises at least one compartment 10, at least one opening element 12, and a device 14 for unlocking the opening element 12. The driverless vehicle 1 preferably comprises at least two compartments 10 and at least two opening elements 12. The driverless vehicle 1 again preferably furthermore comprises at least one retractable compartment partition 16 and motor means 18 linked to the partition 16. In the exemplary embodiment of FIGS. 1 to 4, the driverless vehicle 1 comprises three compartments 10A, 10B, 10C, three opening elements 12A, 12B 12C, and two retractable partitions 16A, 16B.

Figure 1:
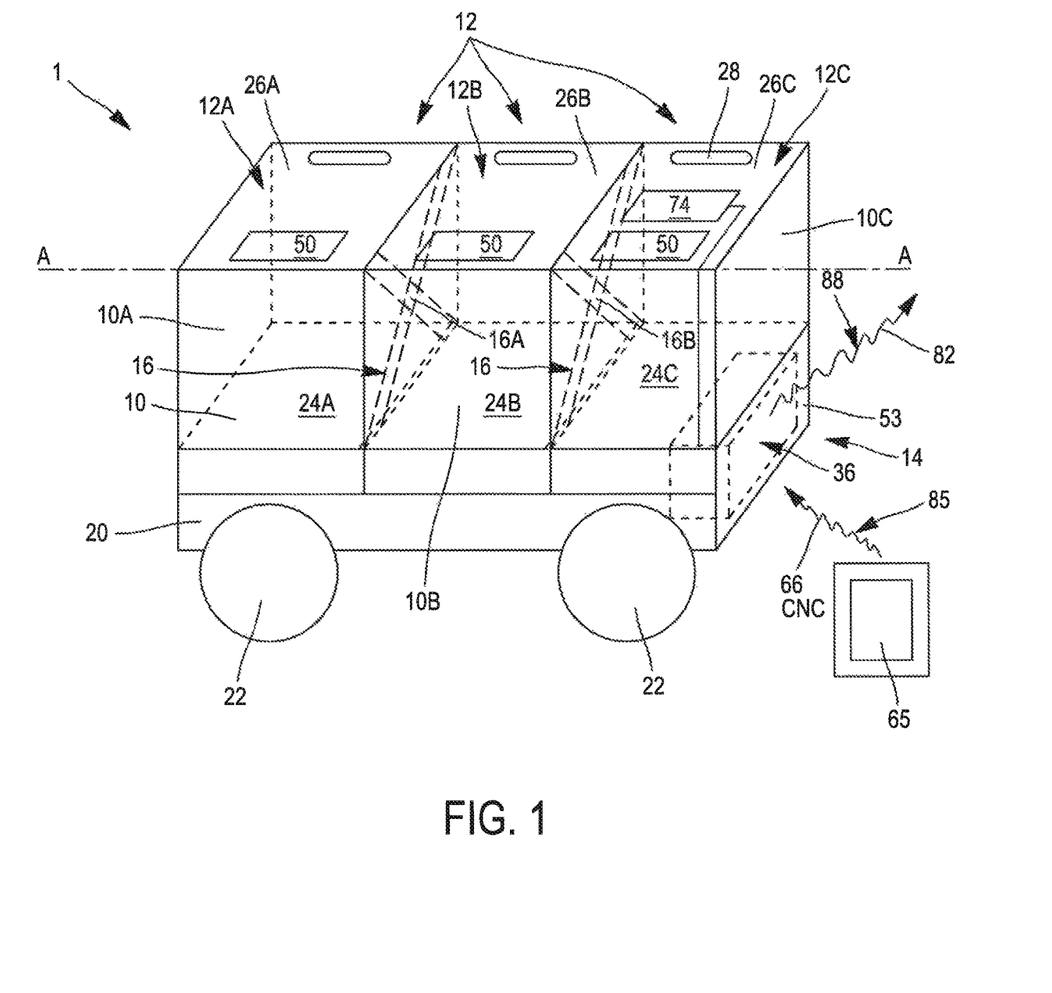
FIG. 1 is a perspective view of a driverless vehicle according to one embodiment of the invention, the vehicle comprising three compartments and two retractable compartment partitions.

The driverless vehicle 1 is for example a land vehicle, as illustrated in FIG. 1. In the particular embodiment of FIGS. 1 to 4, the driverless vehicle 1 is an autonomous land vehicle. As a variant, the driverless vehicle 1 is a land vehicle able to be controlled remotely via radio. Again as a variant, the driverless vehicle 1 is an autonomous land vehicle that is also able to be intermittently controlled remotely by an operator via radio, for example in the context of an "emergency" manual control override procedure.

According to the particular embodiment of FIGS. 1 to 4, the driverless vehicle 1 is equipped, as is conventional, with a chassis 20 on which there are arranged a plurality of wheels 22, for example four wheels 22. The driverless vehicle 1 is also equipped with an autonomous drive and navigation unit 22, linked to the wheels 22, such a unit not being shown in the figures for the sake of clarity.

Each compartment 10A, 10B, 10C defines an inner space 24A, 24B, 24C for receiving an object. Such an object, which is not shown in the figures for the sake of clarity, is for example intended to be delivered to an end user.

Each opening element 12A, 12B, 12C forms access to one of the compartments 10A, 10B, 10C from outside the vehicle 1, and is able to close off the inner space 24A, 24B, 24C associated with this compartment. In the particular exemplary embodiment in FIGS. 1 to 4, each opening element 12A, 12B, 12C is formed of an upper door 26A, 26B, 26C that pivots about an axis A-A, such a door forming access to an inner space 24A, 24B, 24C. Each upper door 26A, 26B, 26C is for example equipped with a grip handle 28 for facilitating opening thereof by a user.

According to a first aspect of the invention, the unlocking device 14 will now be described with reference to FIG. 1, and especially to FIG. 2.

The unlocking device 14 comprises at least one electronic lock 34 and a control module 36 linked to the or each electronic lock 34 via a data link 38. In the particular exemplary embodiment of FIGS. 1 and 2, the unlocking device 22 comprises three electronic locks 34A, 34B, 34C.

Each electronic lock 34A, 34B, 34C is arranged for example inside one of the compartments 10A, 10B, 10C. Each electronic lock 34A, 34B, 34C is able to lock and unlock one of the opening elements 12A, 12B, 12C. The control module 36 is linked to each electronic lock 34A, 34B, 34C via a separate data link 38A, 38B, 38C.

Figure 2:
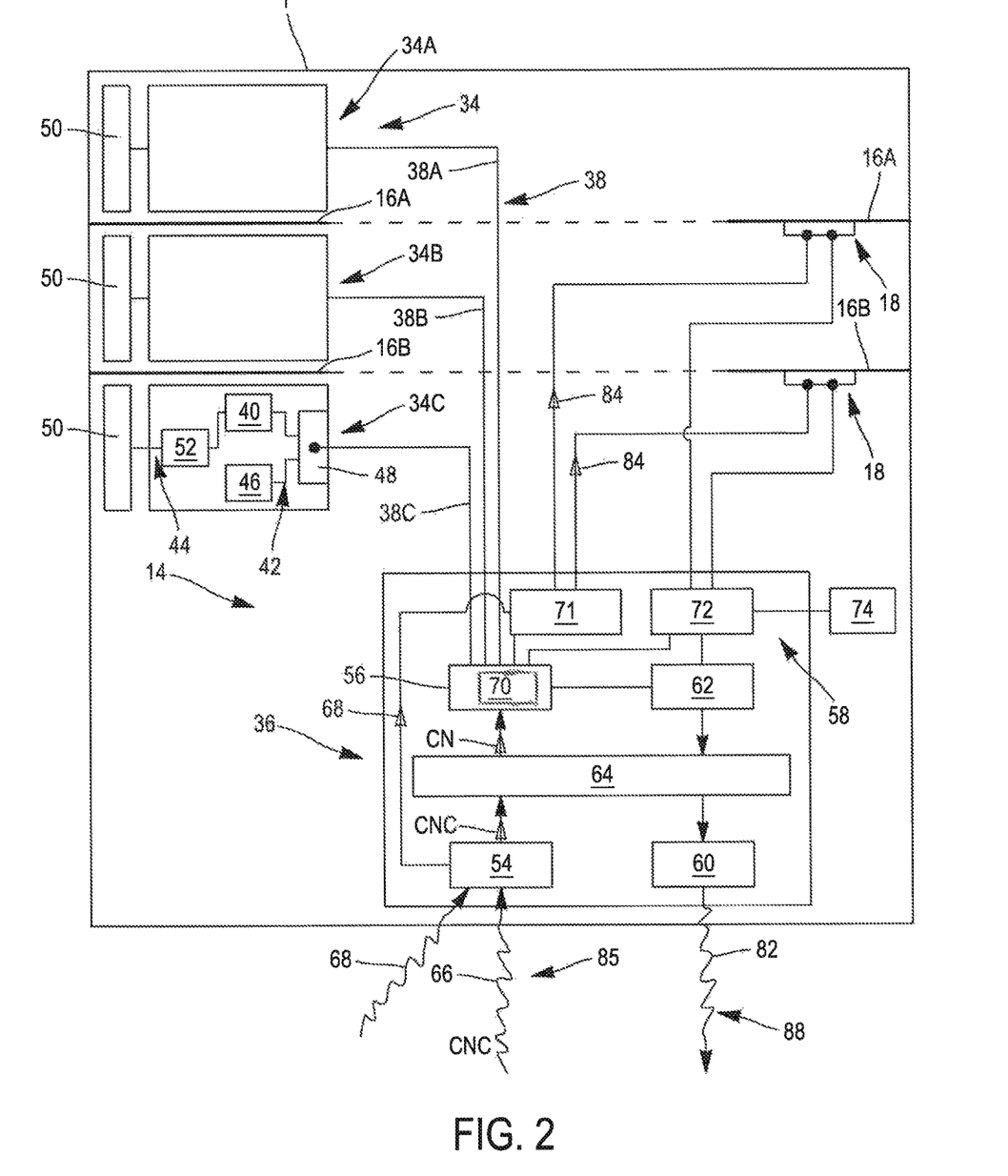
FIG. 2 is a schematic illustration of the driverless vehicle of FIG. 1.

Each electronic lock 34A, 34B, 34C comprises motor means 40 and means 42 for detecting closure of the associated opening element 12A, 12B, 12C, as shown in FIG. 2. In the particular exemplary embodiment of FIGS. 1 and 2, each electronic lock 34A, 34B, 34C furthermore comprises means 44 for supplying electric power to the motor means 40.

The motor means 40 are able to lock and unlock the opening element 12A, 12B, 12C depending on the value of an instruction received via the data link 38A, 38B, 38C, as described hereinafter. The motor means 40 of each electronic lock 34A, 34B, 34C are able to lock the associated opening element 12A, 12B, 12C upon detection of the closure of this opening element by the detection means 42. The motor means 40 are formed for example of a micromotor that allows a mechanism protecting the lock from impacts linked to the movement of the opening element to be moved in translation.

The detection means 42 are able to transmit a signal detecting the closure of the opening element 12A, 12B, 12C associated with the lock, on the associated data link 38A, 38B, 38C. In the exemplary embodiment of FIG. 2, the detection means 42 comprise a motion sensor 46 able to detect closure of the opening element 12A, 12B, 12C, and a data transceiver 48 linked to the motion sensor 46 and to the associated data link 38A, 38B, 38C. The transceiver 48 is furthermore connected to the motor means 40.

The electric power supply means 44 are linked to the motor means 40. In one particular embodiment, illustrated in FIGS. 1 and 2, the electric power supply means 44 comprise an element 50 for converting light energy into electrical energy, and an electrical energy storage element 52 linked to the conversion element 50. The element 50 for converting light energy into electrical energy is a photovoltaic panel, for example. The photovoltaic panel 50 is arranged for example on the outside of the vehicle 1, on the opening element 12A, 12B, 12C associated with the lock, as illustrated in FIG. 1. The electrical energy storage element 52 is a battery, for example. In one variant, not shown, the element 50 for converting light energy into electrical energy is replaced with a dynamo equipped with a piezoelectric system linked to the opening element 12A, 12B, 12C. Such a configuration makes it possible to generate an electric current upon each opening and closing movement of the opening element 12A, 12B, 12C, and thus advantageously to be able to recharge the electrical energy storage element 52, in order to supply electric power to the motor means 40.

Again as a variant, the electric power supply means 44 comprise only an electrical energy storage element, such as consumable cells, cells able to be recharged by an external device, or else a battery. According to this variant, the electric power supply means 44 are able to generate a signal indicative of the current level of charge of the cells or of the battery, and the transceiver 48 is able to transmit this signal to the control module 36 via the data link 38A, 38B, 38C.

The control module 36 is arranged for example underneath a compartment 10C, in a recess 53 formed for this purpose inside the chassis 20, as illustrated in FIG. 1.

The control module 36 comprises a signal sensor 54, an electronic component 56 linked to the sensor 54 and to each data link 38A, 38B, 38C, and electric power supply means 58 linked to the electronic component 56, as shown in FIG. 2. The electric power supply means 58 are preferably also linked to the motor means 18 of the retractable partitions 16A, 16B, in order to supply electric power to these motor means 18. As a variant, not shown, the motor means 18 of each retractable partition 16A, 16B are supplied with power by dedicated electric power supply means, such as for example a photovoltaic panel dedicated to the partition.

The control module 36 furthermore comprises signal transmission means 60 and digital key generation means 62 linked to the electric power supply means 58, to the electronic component 56 and to the transmission means 60. Preferably, as illustrated in FIG. 2, the control module 36 also comprises a data coding component 64. Again preferably, the control module 36 also comprises a unit 71 for driving the motor means 18 of the retractable partitions 16A, 16B, which unit is linked to these motor means 18, on the one hand, and to the sensor 54, on the other hand.

The sensor 54 is able to receive a signal 66 comprising a digital key CN, CNC transmitted by a communication device 65 positioned close to the control module 36, such a communication device 65 being illustrated in FIG. 1. The sensor 54 is able to transmit this signal 66 to the electronic component 56. The sensor 54 is preferably furthermore able to receive a locking confirmation signal for at least one of the opening elements 12A, 12B, 12C and to transmit this signal to the electronic component 56. The sensor 54 is again preferably furthermore able to receive a control signal 68 for moving at least one of the retractable partitions 16A, 16B, as described hereinafter. The sensor 54 is able to transmit this control signal 68 to the unit 71 for driving the motor means 18 of the partitions.

The electronic component 56 is an electronic recognition component for authenticating a digital key CN received via the signal 66. The electronic component 56 is able, when it authenticates the received digital key CN, to generate an instruction signal to deactivate at least one of the motor means 40 in order to unlock at least one of the opening elements 12A, 12B, 12C, and to transmit this signal on the corresponding data link 38A, 38B, 38C.

The electronic component 56 is equipped for example with an analogue-to-digital converter linked to the sensor 54, and with a computing module linked to the converter and formed of at least one processor associated with at least one memory, these various elements not being shown in the figures for the sake of clarity.

Preferably, as illustrated in FIG. 2, the electronic component 56 also comprises an electronic clock 70. The electronic clock 70 is connected for example to the processor of the electronic component 56.

In one particular embodiment, illustrated in FIGS. 1 and 2, the electric power supply means 58 comprise an electrical energy storage element 72 and an energy conversion element 74 linked to the electrical energy storage element 72. The energy conversion element 74 is for example an element for converting light energy into electrical energy, such as for example a photovoltaic panel. The photovoltaic panel 74 is arranged for example on the outside of the vehicle 1, on the opening element 12C associated with the compartment 10C underneath which the control module 36 is arranged, as illustrated in FIG. 1. The electrical energy storage element 72 is a battery, for example. In one variant, not shown, the energy conversion element 74 is an element for converting thermal energy into electrical energy. This allows the energy storage element 72 to be recharged continuously and autonomously, and thus contributes to reducing or even eliminating operations of replacing the electric power supply means 58. In another variant, not shown, the electric power supply means 58 are formed only by an electrical energy storage element, such as consumable cells, cells able to be recharged by an external device, or else a battery.

The transmission means 60 comprise for example a radiofrequency transmitter associated with a digital-to-analogue converter. The radiofrequency transmitter is able for example to transmit a signal contained in the group consisting of: a signal with a frequency contained in the Bluetooth band, a signal with a frequency contained in the NFC (near field technology) band, a signal with a frequency contained in the Wi-Fi band and a signal with a frequency contained in the Zigbee band.

The digital key generation means 62 are able to generate a unique digital key upon each closure of at least one of the opening elements 12A, 12B, 12C, the transmission means 60 being able to transmit a signal 82 containing the generated digital key. More precisely, the generation means 62 are able to generate a unique digital key following the reception, by the electronic component 56, of at least one opening element 12A, 12B, 12C closure detection signal. The generation means 62 are also able to transmit each generated digital key to the electronic component 56, for storage in its memory, thus allowing subsequent authentication of a received digital key CN through comparison with the generated digital key. More precisely, the electronic component 56 is able to authenticate a received digital key CN only through comparison with the last digital key generated upon closure of at least one of the opening elements 12A, 12B, 12C. In one preferred embodiment of the invention, the processor of the electronic component 56 is able to replace, in the memory of the electronic component 56, a possible previously stored digital key with the digital key newly generated upon closure of at least one of the opening elements 12A, 12B, 12C. This advantageously makes it possible to reduce the memory space required to store the digital keys in the memory of the electronic component 56.

The generation means 62 are formed for example of a software module for generating unique digital keys.

In the preferred exemplary embodiment in which the electronic component 56 also comprises an electronic clock 70, timestamp information is associated with the generated unique digital key, and the electronic component 56 is able to authenticate a received digital key CN through comparison with the generated digital key only for a predetermined duration. This makes it possible, if a unique digital key is stolen after it has been transmitted by the control module 36, to reduce the duration of a "notional" temporal window during which access to the inner space of one or more compartments may be compromised. An additional gain in security is thus achieved.

The data coding component 64 is connected between the sensor 54 and the electronic component 56, on the one hand, and between the digital key generation means 62 and the signal transmission means 60, on the other hand. The coding component 64 is able to encode the unique digital keys generated by the generation means 62. The coding component 64 is furthermore able to decode an encoded digital key CNC contained in the signal 66 and to transmit the decoded digital key CN to the electronic component 56. The coding component 64 is preferably also able to transmit the encoded digital keys to the transmission means 60, after the electronic component 56 has received a locking confirmation signal for at least one of the opening elements 12A, 12B, 12C. As a variant, the coding component 64 is able to transmit the encoded digital keys to the transmission means 60 immediately after they have been encoded.

The coding component 64 is preferably a symmetric encryption component. More particularly, the coding component 64 is able to apply a symmetric encryption algorithm having a symmetric cryptographic key as parameter to the unique digital key generated by the generation means 62. In one preferred embodiment, the symmetric encryption component 64 includes a memory. According to this preferred embodiment, the symmetric encryption component 64 is able to regenerate, after a predetermined duration, a new symmetric cryptographic key used as a parameter for the symmetric encryption algorithm, and to keep the or each previously generated symmetric cryptographic key in its memory for as long as unique digital keys encoded by these symmetric keys are still in circulation. This makes it possible, if a symmetric encryption key is stolen after it has been generated by the symmetric encryption component 64, to reduce the duration of a "notional" temporal window during which access to the inner space of one or more compartments may be compromised. An additional gain in security is thus achieved.

By keeping the generated symmetric cryptographic key, the coding component 64 is thus the only one able to decode the encoded digital keys transmitted to the transmission means 60. This makes it possible to increase the level of confidentiality of the generated keys. In one variant implementation, the coding component 64 is a data masking or obfuscation component. In another embodiment, which may be combined with the previous embodiments, the coding component 64 is furthermore able to apply an asymmetric encryption algorithm having a previously received public cryptographic key as parameter to a digital key that it has encoded beforehand. The asymmetric encryption algorithm is for example an RSA (Rivest Shamir Adleman) algorithm. This makes it possible, if the coding component 64 is compromised by a malicious user, to avoid this user being able to compromise access to all of the compartments of the vehicle. An additional gain in security is thus achieved. In another embodiment, which may be combined with the previous embodiments, the coding component 64 is able to attach a digital signature to each generated unique digital key. The digital signature is for example an SHA (Secure Hash Algorithm) digital signature.

Each data link 38A, 38B, 38C is a wired or wireless bidirectional link. In the embodiment of the invention in FIGS. 1 and 2, each data link 38A, 38B, 38C is a bidirectional radio link, for example. As a variant, not shown, each data link 38A, 38B, 38C is an encoded bidirectional point-to-point link.

The unit 71 for driving the motor means 18 is able, following the reception of a control signal 68 for moving a retractable partition 16A, 16B, to transmit a control signal 84 to the associated motor means 18 in order to retract the partition or put it back in place.

The communication device 65 is able to transmit the signal 66 comprising an encoded digital key CNC or non-encoded digital key CN on a wireless link 85.

Figure 3:
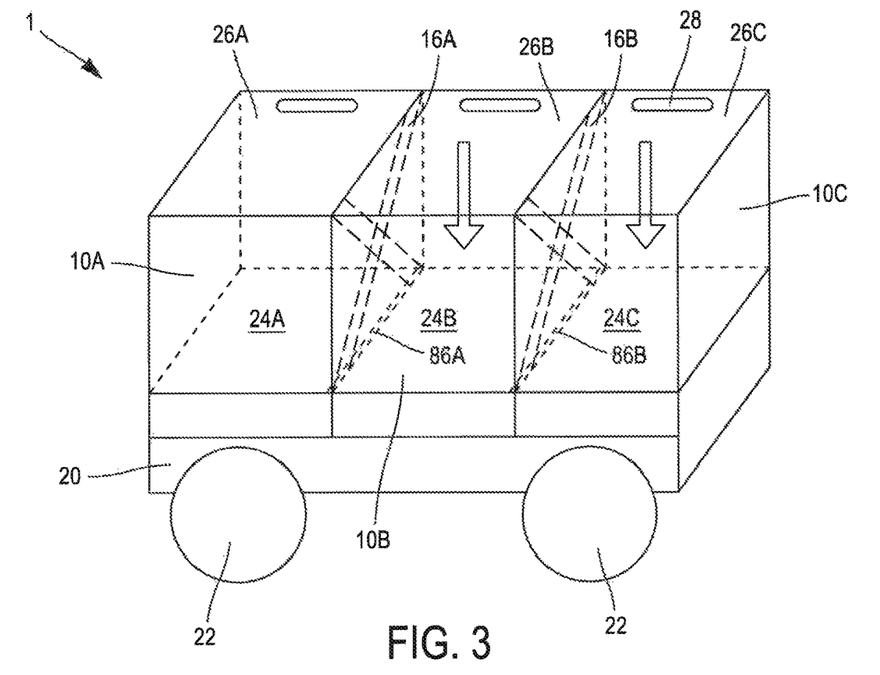
FIG. 3 is a view analogous to that of FIG. 1, in which some elements of FIG. 1 are not shown for the sake of clarity, and in which the compartment partitions are in a non-retracted position.
Figure 4:
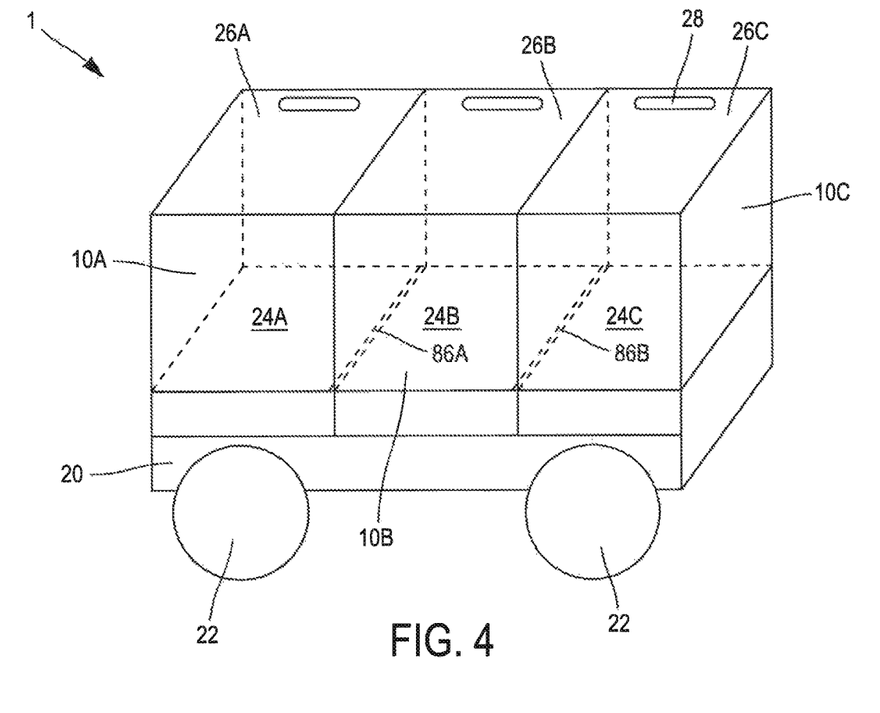
FIG. 4 is a view analogous to that of FIG. 1, in which some elements of FIG. 1 are not shown for the sake of clarity, and in which the compartment partitions are in a retracted position.

Each retractable partition 16A, 16B is able to move between a non-retracted position, shown in FIG. 3, and a retracted position, shown in FIG. 4; and vice versa.

Each retractable compartment partition 16A, 16B is arranged between two compartments 10A, 10B, 10C so as to separate, in the non-retracted position, the respective inner spaces 24A, 24B, 24C defined by these compartments. For example, in the particular embodiment of FIGS. 1 and 2 in which the driverless vehicle 1 comprises two retractable partitions 16A, 16B, a first partition 16A separates, in the non-retracted position, the inner spaces 24A, 24B defined by a first and a second compartment 10A, 10B. Still according to this same particular embodiment, a second partition 16B separates, in the non-retracted position, the inner spaces 24B, 24C defined by the second compartment 10B and by a third compartment 10C.

As illustrated in FIGS. 3 and 4, each retractable partition 16A, 16B is formed for example of a cross-shaped panel, able to retract into the chassis 20 through a slot 86A, 86B provided for this purpose in the chassis 20.

The motor means 18 of each compartment partition 16A, 16B are able to retract the partition 16A, 16B and put it back in place depending on the value of the received control signal 84. The motor means 18 of each partition 16A, 1B are formed for example of a micro-motor allowing the partition to be moved in translation between its non-retracted position and its retracted position, and vice versa, depending on the value of the received control signal 84.

In one particular embodiment of the invention, the compartments arranged on the driverless vehicle are grouped together into one or more modular and removable trunks, able to be fastened to the chassis of said vehicle by way of mechanical or electromechanical means. The trunk or trunks may be locked to said chassis by way of an electronic lock, such as described above.

The modular nature of the trunks is provided by retractable compartment partitions, as described above, and is able to be managed in the same way.

In the case of a plurality of trunks, these may be stacked so as to achieve an optimum arrangement on the driverless vehicle. The trunks may be filled in advance and placed on the vehicle or on the unit at the time of delivery. The modular trunks according to the invention are interchangeable, and delivery is thus sped up.

The operation of the driverless vehicle 1 will now be described.

For the following text, it is assumed that a "delivering" user places an object to be delivered that is intended for the user of the communication device 65, hereinafter called "recipient", inside the vehicle 1. More precisely, the "delivering" user places the object to be delivered in one of the compartments 10A, 10B, 10C of the vehicle 1, and then closes the associated opening element 12A, 12B, 12C. The object to be delivered is a package, for example. The detection means 42 arranged inside the corresponding electronic lock 34A, 34B, 34C detect the closure of the associated opening element 12A, 12B, 12C, and transmit an opening element 12A, 12B, 12C closure detection signal on the associated data link 38A, 38B, 38C.

In a following step, the electronic recognition component 56 receives an opening element 12A, 12B, 12C closure detection signal. The electronic component 56 generates an instruction signal to activate the motor means 40 in order to lock the opening element 12A, 12B, 12C, and transmits this signal on the associated data link 38A, 38B, 38C. After the electronic lock 34A, 34B, 34C has received the instruction signal to activate the motor means, the motor means 40 lock the opening element 12A, 12B, 12C.

In a following step, the generation means 62 generate a unique digital key CN. The generation means 62 transmit this unique digital key CN to the electronic recognition component 56 and to the coding component 64.

In a following step, the electronic component 56 stores the unique digital key CN in its memory. Preferably, in this same step, the coding component 64 encodes the digital key CN.

Preferably, in a following step, the "delivering" user transmits an opening element 12A, 12B, 12C locking confirmation signal to the sensor 54, for example via a communication device. Following the reception of the confirmation signal by the electronic component 56 via the sensor 54, the electronic component 56 transmits, to the coding component 64, an instruction signal to transmit the encoded digital key CNC to the transmission means 60. At the end of this step, the coding component 64 transmits the encoded digital key CNC to the transmission means 60 of the control module 36. The transmission means 60 then transmit the signal 82 containing the encoded digital key CNC on a data link 88, for example to a data storage server. In this preferred step, if the electronic component 56 has not received any locking confirmation signal transmitted by a communication device after a predetermined duration has elapsed, the electronic component 56 generates an instruction signal to deactivate the motor means 40 in order to unlock the opening element 12A, 12B, 12C, and transmits this signal on the associated data link 38A, 38B, 38C. The initial step of the user closing the opening element 12A, 12B, 12C is then implemented again.

For the following text, it is assumed that the driverless vehicle 1 is travelling to a "recipient" user, in order to deliver the object to be delivered; and that this user is made aware of the arrival of the driverless vehicle 1, for example via a notification on his communication device 65. It is furthermore assumed that the "recipient" user receives the encoded unique digital key CNC on his communication device 65, for example via the data storage server. It is assumed lastly that the recipient approaches the control module 36, since he inputs, via his communication device 65, an instruction to send the encoded digital key CNC to the control module 36. The communication device 65 then transmits the signal 66 containing the encoded digital key CNC to the control module 36 on the wireless link 85.

In a following step, the sensor 54 receives the signal 66 containing the encoded digital key CNC. The sensor 54 then transmits the encoded digital key CNC to the coding component 64. In this same step, the coding component 64 decodes the encoded digital key CNC and then transmits the obtained digital key CN to the electronic recognition component 56.

In a following step, the electronic recognition component 56 authenticates the received digital key CN through comparison with the digital key stored beforehand inside its memory.

In a following step, the electronic recognition component 56 generates a deactivation instruction signal intended for the motor means 40 of the electronic lock 34A, 34B, 34C associated with the opening element 12A, 12B, 12C that forms access to the compartment 10A, 10B, 10C inside which the object to be delivered is arranged. The electronic recognition component 56 then transmits this deactivation instruction signal on the corresponding data link 38A, 38B, 38C. After the electronic lock 34A, 34B, 34C has received the instruction signal to deactivate the motor means, the motor means 40 unlock the opening element 12A, 12B, 12C, thus opening up access to the inner space 24A, 24B, 24C of the corresponding compartment 10A, 10B, 10C. At the end of this step, the "recipient" user is able to open this opening element 12A, 12B, 12C, and then recover the object inside the compartment 10A, 10B, 10C.

According to a second aspect, which is additional to but independent from the first aspect, the invention also relates to a method for simultaneously unlocking at least two opening elements 12A, 12B, 12C of the driverless vehicle 1.

The simultaneous unlocking method is implemented by the control module 36 of the vehicle 1, in the particular exemplary embodiment in which the vehicle 1 comprises at least one retractable compartment partition 16 and motor means 18 linked to the partition 16.

According to one particular embodiment of this example, the digital key generation means 62 of the control module 36 are advantageously able, when said at least one of the partitions 16A, 16B is in its retracted position, to generate a unique digital key only when closure of all of the opening elements 12A, 12B, 12C that form access to the compartments 10A, 10B, 10C arranged on either side of this or these partition(s) is detected. For example, when the first partition 16A is in its retracted position, the digital key generation means 62 are able to generate a unique digital key only when closure of the first and second opening elements 12A, 12B, which form access to the first and second compartments 10A, 10B, is detected.

Furthermore, still according to this same particular embodiment, the electronic recognition component 56 is advantageously able, when at least one of the partitions 16A, 16B is in its retracted position, to generate, following authentication of a received digital key CN, a simultaneous deactivation instruction signal intended for the motor means 40 of all of the electronic locks 34A, 34B, 34C associated with the opening elements 12A, 12B, 12C that form access to the compartments 10A, 10B, 10C arranged on either side of these partition(s). Simultaneous unlocking of these opening elements is then achieved. For example, when the first partition 16A is in its retracted position, the electronic recognition component 56 is able to generate, following authentication of a received digital key CN, a simultaneous deactivation instruction signal intended for the motor means 40 of the first and second electronic locks 34A, 34B, associated with the first and second opening elements 12A, 12B that form access to the first and second compartments 10A, 10B.

The method for simultaneously unlocking opening elements of a driverless vehicle will now be described with reference to the simultaneous unlocking of the first and second opening elements 12A, 12B, it being understood that said method applies in the same way to the simultaneous unlocking of opening elements 12A, 12B, 12C of the vehicle 1 in a number greater than two.

Initially, the first and second retractable partitions 16A, 16B are each in their non-retracted position, and the opening elements 12A, 12B, 12C of the vehicle are all unlocked. It is assumed that the signal sensor 54 receives a control signal 68 for moving the first retractable partition 16A. This control signal 68 corresponds to an order to combine the first and second compartments 10A, 10B; for example transmitted by a "delivering" user via a communication device. The sensor 54 then transmits this control signal 68 to the unit 71 for driving the motor means 18 of the partitions.

The method comprises an initial step of transmitting a control signal 84 to retract the first partition 16A to motor means 18 linked to the first partition 16A. The retraction control signal 84 is transmitted by the driving unit 71. The first partition 16A is then moved from its non-retracted position to its retracted position by the associated motor means 18.

For the following text, it is assumed that the "delivering" user places an object to be delivered that is intended for the user of the communication device 65, hereinafter called "recipient", inside the vehicle 1. More precisely, the "delivering" user places the object to be delivered in the first and second compartments 10A, 10B of the vehicle 1, and then closes the associated first and second opening elements 12A, 12B. The object to be delivered is a package, for example. The detection means 42 arranged inside each of the first and second electronic locks 34A, 34B detect the closure of the associated opening element 12A, 12B, and transmit an opening element 12A, 12B closure detection signal on the associated data link 38A, 38B.

In a following step, the electronic recognition component 56 receives a first opening element 12A closure detection signal and a second opening element 12B closure detection signal. More generally, the method loops back to this step for as long as the electronic recognition component 56 has not received all of the closure signals associated with all of the opening elements that form access to the compartments arranged on either side of the retracted partition(s).

In a following step, the electronic recognition component 56 detects the reception of all of the closure signals associated with all of the opening elements 12A, 12B that form access to the compartments 10A, 10B arranged on either side of the retracted partition 16A.

In a following step, the generation means 62 generate a unique digital key CN. The generation means 62 transmit this unique digital key CN to the electronic recognition component 56 and to the coding component 64.

In a following step, the electronic component 56 stores the unique digital key CN in its memory. Preferably, in this same step, the coding component 64 encodes the digital key CN.

In a following step, the coding component 64 transmits the encoded digital key CNC to the transmission means 60 of the control module 36. The transmission means 60 then transmit the signal 82 containing the coded digital key CNC on a data link 88, for example to a data storage server.

For the following text, it is assumed that the driverless vehicle 1 is travelling to the "recipient" user, in order to deliver the object to be delivered; and that this user is made aware of the arrival of the driverless vehicle 1, for example via a notification on his communication device 65. It is furthermore assumed that the "recipient" user receives the encoded unique digital key CNC on his communication device 65, for example via the data storage server. It is assumed lastly that the recipient approaches the control module 36, since he inputs, via his communication device 65, an instruction to send the encoded digital key CNC to the control module 36. The communication device 65 then transmits the signal 66 containing the encoded digital key CNC to the control module 36 on the wireless link 85.

In a following step, the sensor 54 receives the signal 66 containing the encoded digital key CNC. The sensor 54 then transmits the encoded digital key CNC to the coding component 64. In this same step, the coding component 64 decodes the encoded digital key CNC and then transmits the obtained digital key CN to the electronic recognition component 56.

In a following step, the electronic recognition component 56 authenticates the received digital key CN through comparison with the digital key stored beforehand inside its memory.

In a following step, the electronic recognition component 56 generates a simultaneous deactivation instruction signal intended for the motor means 40 of all of the electronic locks 34A, 34B associated with the opening elements 12A, 12B that form access to the compartments 10A, 10B arranged on either side of the retracted partition 16A. The electronic recognition component 56 then transmits this simultaneous deactivation instruction signal on corresponding first and second data links 38A, 38B. Simultaneous unlocking of the corresponding opening elements 12A, 12B is then achieved. At the end of this step, the "recipient" user is able to open the first and second opening elements 12A, 12B, and then recover the object inside the first and second compartments 10A, 10B.

It is thus appreciated that the method for simultaneously unlocking at least two opening elements of a driverless vehicle according to the invention makes it possible to be able to combine at least two compartments of the vehicle so as to achieve a compartment of larger size, while at the same time facilitating access to the inside of the resulting compartment via simultaneous opening of all of the opening elements that form access to this compartment, and while making it possible to ensure simple and reliable management of the generated digital keys.

The invention is described in the above text by way of example. It is understood that a person skilled in the art is able to implement numerous variant embodiments of the invention without however departing from the scope of the invention. In particular, although the invention is described with reference to an autonomous land vehicle, it is applicable more generally to any driverless vehicle able to move on land, on water or in the air, autonomously and/or by being controlled remotely via radio. The invention is applicable in the same way to a drone, for example.

The invention claimed is:

1. Driverless vehicle (1), comprising:
   at least two compartments (10, 10A, 10B, 10C), each defining an inner space (24A, 24B, 24C) for receiving an object;
   at least two opening elements (12, 12A, 12B, 12C), each opening element forming access to a separate compartment from outside the vehicle (1), each opening element being able to close off one of said inner spaces (24A, 24B, 24C);
   a device (14) for unlocking each opening element, the device (14) comprising at least one electronic lock (34, 34A, 34B, 34C) and a control module (36) linked to the electronic lock via a data link (38, 38A, 38B, 38C), the electronic lock comprising motor means (40) able to lock and unlock the opening element depending on the value of an instruction received via the data link, the control module (36) comprising a sensor (54) for sensing a signal (66) comprising a digital key and an electronic recognition component (56) for authenticating the digital key, the sensor (54) being able to transmit the signal (66) to the electronic recognition component (56), said component being linked to the data link and being supplied with power by electric power supply means (58), the authentication of the digital key by the electronic component (56) generating an instruction signal to deactivate the motor means (40) in order to unlock the opening element, wherein the electronic lock comprises means (42) for detecting closure of the opening element, which means are able to transmit a closure detection signal on the data link, and the control module (36) furthermore comprises means (60) for transmitting a signal (82) and digital key generation means (62) linked to the electric power supply means (58), to the electronic component (56) and to the transmission mains (60), the generation means (62) being able to generate a unique digital key upon each closure of the opening element, the transmitted signal (82) containing the generated unique digital key, the electronic component (56) being able to authenticate the received digital key through comparison with the generated digital key, characterized in that the vehicle (1) furthermore includes at least one retractable compartment partition (16, 16A, 16B) and motor means (18) linked to said partition and able to retract the partition and put it back in place depending on the value of a received control signal (84), said partition being arranged between two compartments (10A, 10B, 10C) so as to separate, in the nonretracted position, the respective inner spaces (24A, 24B, 24C) defined by these compartments, the control module (36) furthermore being linked to the motor means (18) and being able to transmit a control signal (84) to the motor means (18) in order to retract the partition or put it back in place, wherein the digital key generation means (62) of the control module (36) are able, when said at least one compartment partition is in a retracted position, to generate a unique digital key only when closure of all of the opening elements that form access to the compartments arranged on either side of said retracted partition(s) is detected; and in that the electronic recognition component (56) of the control module (36) is able, when said at least one compartment partition is in a retracted position, to generate, following authentication of a digital key, a simultaneous deactivation instruction signal intended for the motor means (40) of all of the electronic locks associated with the opening elements that form access to the compartments arranged on either side of said retracted partition(s), in order to unlock said opening elements.

2. Vehicle (1) according to claim 1, characterized in that the electronic component (56) comprises an electronic clock (70), in that timestamp information is associated with the generated unique digital key, and in that the electronic component (56) is able to authenticate a received digital key through comparison with the generated unique digital key only for a predetermined duration.

3. Vehicle (1) according to claim 1, characterized in that the vehicle (1) is a land vehicle able to be controlled remotely via radio.

4. Vehicle (1) according to claim 1, characterized in that the vehicle (1) is an autonomous land vehicle.

5. Vehicle (1) according to claim 1, characterized in that the electric power supply means (58) comprise an electrical energy storage element (72) and an element (74) for converting light energy into electrical energy, such as for example a photovoltaic panel, linked to the electrical energy storage element (72).

6. Vehicle (1) according to claim 1, characterized in that the electronic lock (34, 34A, 34B, 34C) furthermore comprises means (44) for supplying electric power to the motor means (40).

7. Vehicle (1) according to claim 1, characterized in that the at least two compartments (10, 10A, 10B, 10C) are grouped together into one or more modular and removable trunks, able to be fastened to the chassis of said vehicle (1) by way of mechanical or electromechanical means.

8. Vehicle (1) according to claim 6, characterized in that the means (44) for supplying electric power to the motor means (40) comprise an electrical energy storage element (52) and an element (50) for converting light energy into electrical energy, such as for example a photovoltaic panel, linked to the electrical energy storage element (52).

9. Method for simultaneously unlocking at least two opening elements (12A, 12B, 12C) of a driverless vehicle (1), the method being implemented by the control module (36) of a vehicle (1) according to claim 1, the method comprising an initial step of transmitting a control signal (68) to retract said at least one partition (16, 16A, 16B), intended for motor means (18) linked to said partition, the method furthermore comprising the following steps:

receiving, for each opening element forming access to the compartment arranged on either side of said or of one of said retracted partition(s), an opening element closure detection signal;

detecting the reception of all of the closure signals associated with all of the opening elements that form access to the compartments arranged on either side of said retracted partition(s);

generating a unique digital key;

storing the generated unique digital key inside the electronic recognition component;

transmitting a signal (82) that contains the generated unique digital key;

receiving a signal (66) that contains a digital key;

authenticating the received digital key through comparison with the generated digital key, by the electronic recognition component (56);

transmitting, on the or each data link in question, a simultaneous deactivation instruction signal intended for the motor means (40) of all of the electronic locks associated with the opening elements that form access to the compartments arranged on either side of said retracted partition(s), in order to unlock said opening elements;

when said at least one compartment partition is in a retracted position, generating a unique digital key only when closure of all of the opening elements that form access to the compartments arranged on either side of said retracted partition(s) is detected;

when said at least one compartment partition is in a retracted position, unlocking said opening elements by generating, following authentication of a digital key, a simultaneous deactivation instruction signal intended for the motor means (40) of all of the electronic locks associated with the opening elements that form access to the compartments arranged on either side of said retracted partition(s).

10. A non-transitory computer readable medium that comprises a computer program including instructions that lead to the implementation of a method according to claim 9 when they are executed by a processor of a computer system.

* * * * *